(12) United States Patent
Codilian et al.

(10) Patent No.: US 7,561,374 B1
(45) Date of Patent: Jul. 14, 2009

(54) METHOD OF FABRICATING DISK DRIVES USING A COMMON DISK DRIVE BASE WITH AN ATTACHED WEIGHT PLATE, AND A DISK DRIVE INCLUDING THE SAME

(75) Inventors: Raffi Codilian, Irvine, CA (US); Wally Szeremeta, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 633 days.

(21) Appl. No.: 10/922,722

(22) Filed: Aug. 19, 2004

(51) Int. Cl.
*G11B 33/14* (2006.01)
(52) U.S. Cl. .................................... 360/97.02
(58) Field of Classification Search .......... 360/97.01, 360/97.02, 97.03, 97.04
See application file for complete search history.

(56) References Cited

U.S. PATENT DOCUMENTS

| | | | |
|---|---|---|---|
| 6,351,344 B1* | 2/2002 | Krum et al. | 360/97.01 |
| 6,690,540 B2* | 2/2004 | Hirasaka et al. | 360/97.02 |
| 6,947,252 B2* | 9/2005 | Kang et al. | 360/97.02 |
| 7,206,165 B2* | 4/2007 | Lee | 360/97.01 |
| 2002/0054453 A1* | 5/2002 | Alan | 360/97.01 |
| 2007/0002489 A1* | 1/2007 | Abe | 360/97.01 |
| 2008/0271929 A1* | 11/2008 | Whitney | 177/25.12 |

* cited by examiner

*Primary Examiner*—Allen T Cao
(74) *Attorney, Agent, or Firm*—Blakely, Sokoloff, Taylor & Zafman, LLP (57) ABSTRACT

A method of fabricating disk drives. The method includes providing disk drives based upon a first disk drive configuration. The first disk drive configuration includes an operable disk drive including a disk drive base with an exterior bottom side, and a first weight plate attached to the exterior bottom side of the disk drive base. The method further includes providing disk drives based upon a second disk drive configuration. The second disk drive configuration includes the operable disk drive, and a second weight plate attached to the exterior bottom side of the disk drive base. The second weight plate has a mass different than a mass of the first weight plate. In another embodiment, the second disk drive configuration includes the disk drive base being exposed without any weight plated attached. Another aspect of the invention includes a disk drive with a weight plate.

19 Claims, 6 Drawing Sheets

(PRIOR ART)

*Fig. 13*

(PRIOR ART)

*Fig. 14*

METHOD OF FABRICATING DISK DRIVES USING A COMMON DISK DRIVE BASE WITH AN ATTACHED WEIGHT PLATE, AND A DISK DRIVE INCLUDING THE SAME

BACKGROUND OF THE INVENTION

1. Field of the Invention

The present invention relates generally to disk drives, and in particular to a method of fabricating disk drives using a common disk drive base with an attached weight plate, and a disk drive including the same.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider for reading and writing data from and to the disk.

In certain applications, such as for use in consumer set top audio video applications, it is critical that the disk drive generated self-induced vibration is kept below minimum specified levels. Such vibration coupled with a poor chassis design that the disk drive is intended to be installed may result in vibrations that generate acoustic noise. Acoustic noise is a major source of distraction in such applications. In this regard, for such applications there are typically strict specifications for both disk drive vibration and overall vibration induced acoustic noise. Other applications, such as for desktop personal computers, may have much lower vibration specifications, even though such disk drives may otherwise meet desired memory capacity and speed performance requirements.

There is a need in the art for an improved method of manufacturing disk drives and improved disk drives in comparison to the prior art.

SUMMARY OF THE INVENTION

According to an aspect of the present invention, there is provided a method of fabricating disk drives. The method includes providing disk drives based upon a first disk drive configuration. The first disk drive configuration includes an operable disk drive including a disk drive base with an exterior bottom side, and a first weight plate attached to the exterior bottom side of the disk drive base. The method further includes providing disk drives based upon a second disk drive configuration. The second disk drive configuration includes the operable disk drive, and a second weight plate attached to the exterior bottom side of the disk drive base. The second weight plate has a mass different than a mass of the first weight plate. The first disk drives may be provided to a first customer, and the second disk drives may be provided to a second customer. In another arrangement, the first disk drives and the second disk drives are provided to a same customer.

According to another aspect of the present invention, there is provided another method of fabricating disk drives. The method includes providing disk drives based upon a first disk drive configuration. The first disk drive configuration includes an operable disk drive including a disk drive base with an exterior bottom side, and a weight plate attached to the exterior bottom side of the disk drive base. The method further includes providing disk drives based upon a second disk drive configuration. The second disk drive configuration includes the operable disk drive. The disk drive base is exposed without any weight plate attached to the exterior bottom side. The first disk drives may be provided to a first customer, the second disk drives may be provided to a second customer. In another arrangement, the first disk drives and the second disk drives are provided to a same customer.

According to another aspect of the present invention, there is provided a disk drive. The disk drive includes a disk drive base. The disk drive base includes an exterior bottom side, a bottom peripheral edge disposed about the exterior bottom side, and an exterior facing cavity formed in the disk drive base defined by the exterior bottom side. The bottom peripheral edge defines a disk drive form factor. The disk drive further includes a weight plate attached to the disk drive base within the exterior facing cavity. The weight plate includes an outer surface and an opposing inner surface. The inner surface is disposed towards the exterior bottom side. The outer surface is substantially aligned with the disk drive form factor.

According to various embodiments, the cavity defines a cavity cross sectional area aligned with the bottom peripheral edge, and the weight plate extends substantially across an entirety of the cavity cross sectional area. The inner surface may be cooperatively formed with the exterior bottom side. The exterior bottom side may include a structural honeycomb contour. The inner surface of the weight plate may be generally flat. The weight plate may be formed of a metal material, such as a steel material. The weight plate may be attached to the disk drive base such as through the use of fasteners. The weight plate may also be adhesively attached or press-fit attached.

According to yet another aspect of the present invention, there is provided a disk drive. The disk drive includes a disk drive base. The disk drive base includes an exterior bottom side, a bottom peripheral edge disposed about the exterior bottom side, and an exterior facing cavity formed in the disk drive base defined by the exterior bottom side. The bottom peripheral edge defines a disk drive form factor. The cavity defines a cavity cross sectional area aligned with the bottom peripheral edge, and the weight plate extends substantially across an entirety of the cavity cross sectional area.

DESCRIPTION OF THE PREFERRED EMBODIMENTS

Figure 12:
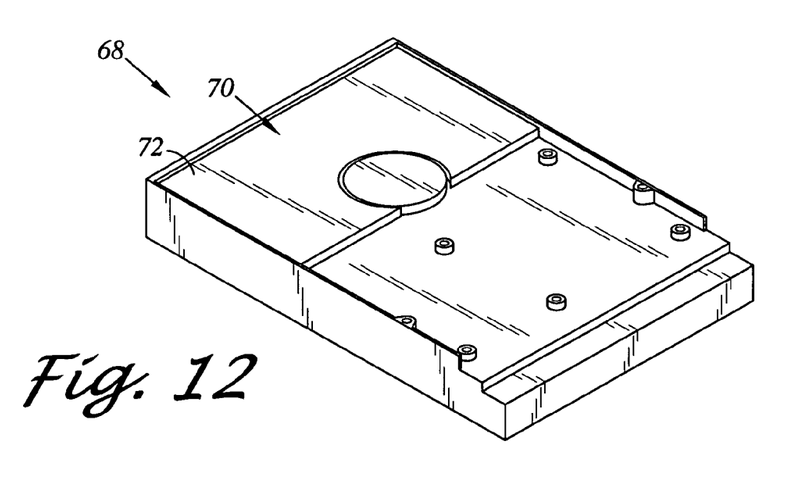
FIG. 12 is a perspective view of a disk drive base according to another embodiment with a generally flat exterior bottom side.
Figure 13:
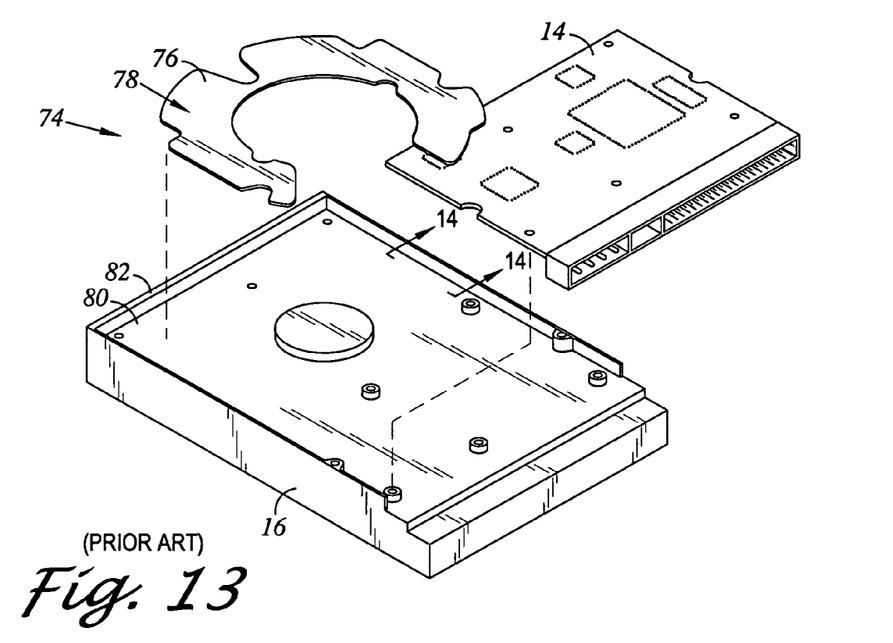
FIG. 13 (PRIOR ART) is a exploded perspective view similar to that of FIG. 2, however, with a prior art disk drive including an electromagnetic shield.
Figure 14:
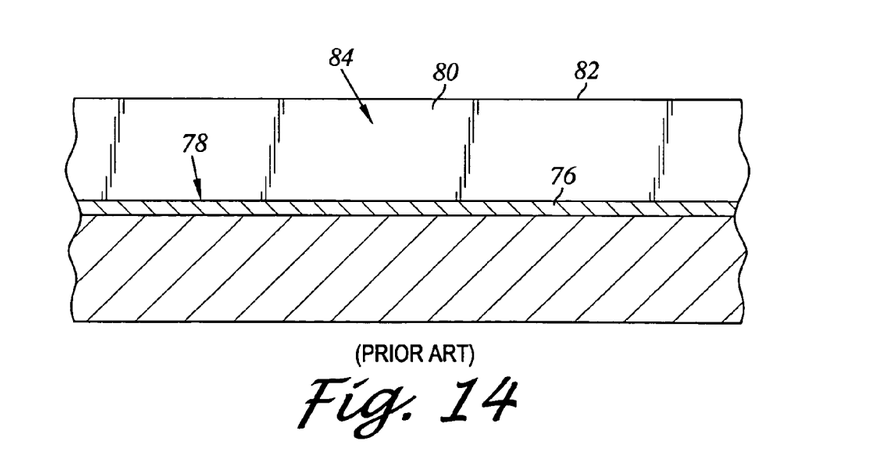
FIG. 14 (PRIOR ART) is a cross sectional side view of the disk drive base as seen along axis 14-14 of FIG. 13 as shown with the electromagnetic shield.

Referring now to the drawings wherein the showings are for purposes of illustrating preferred embodiments of the present invention only, and not for purposes of limiting the same, FIGS. 1-12 illustrate a disk drive including weight plates in accordance with aspects of the present invention (with FIGS. 13-14 depicting a prior art device).

Figure 1:
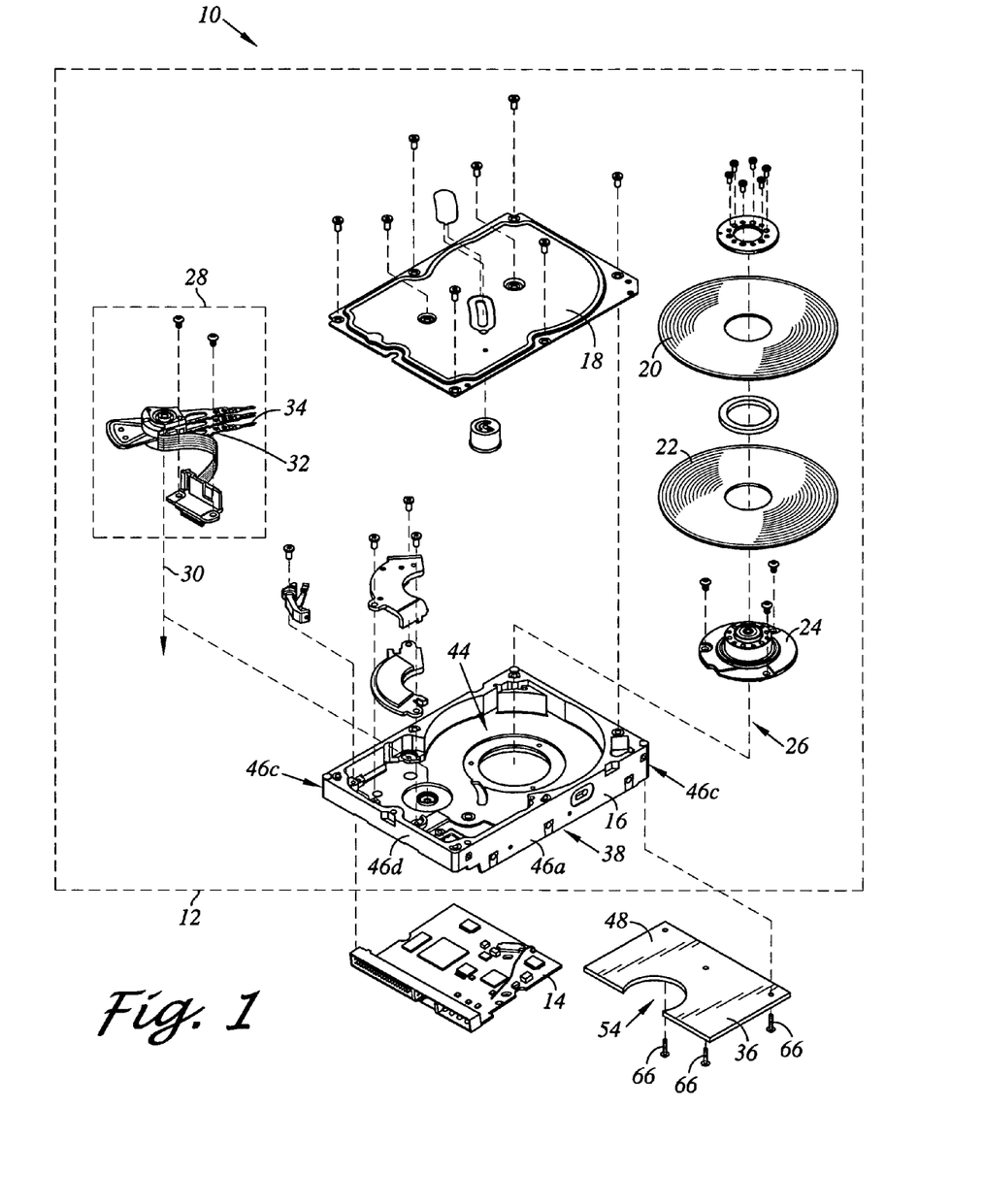
FIG. 1 is an exploded perspective view of a disk drive including a disk drive base and a weight plate of an aspect of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22. Each magnetic disk 20, 22 contains a plurality of tracks for storing data.

The head disk assembly 12 further includes a spindle motor 24 for rotating the magnetic disks 20, 22 about an axis of rotation 26. The head disk assembly 12 further includes a head stack assembly 28 that rotates between limited positions about a pivot axis 30. The head stack assembly 28 includes a plurality of actuator arms, the lowermost one is denoted as 32. A plurality of air bearing sliders, the lowermost one being denoted 34, are distally supported by the actuator arms 32 respectively adjacent the disks 20, 22. Each air bearing slider 34 includes a transducer head for reading and writing data from and to the disks 20, 22.

Figure 2:
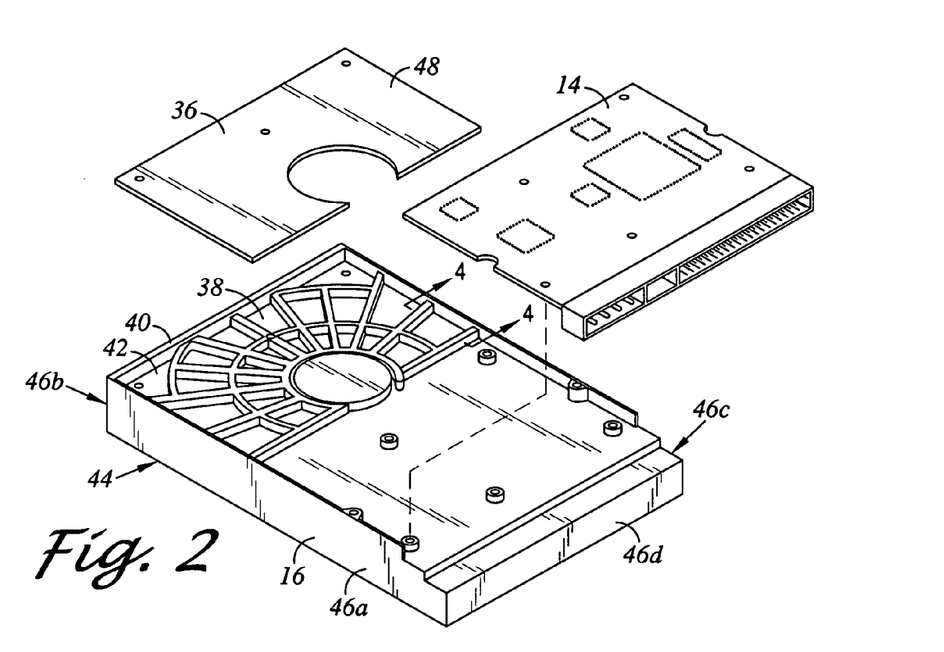
FIG. 2 is an enlarged perspective view of the disk drive base of FIG. 1 after having been flipped as shown with a printed circuit board assembly and the weight plate exploded from the disk drive base.
Figure 3:
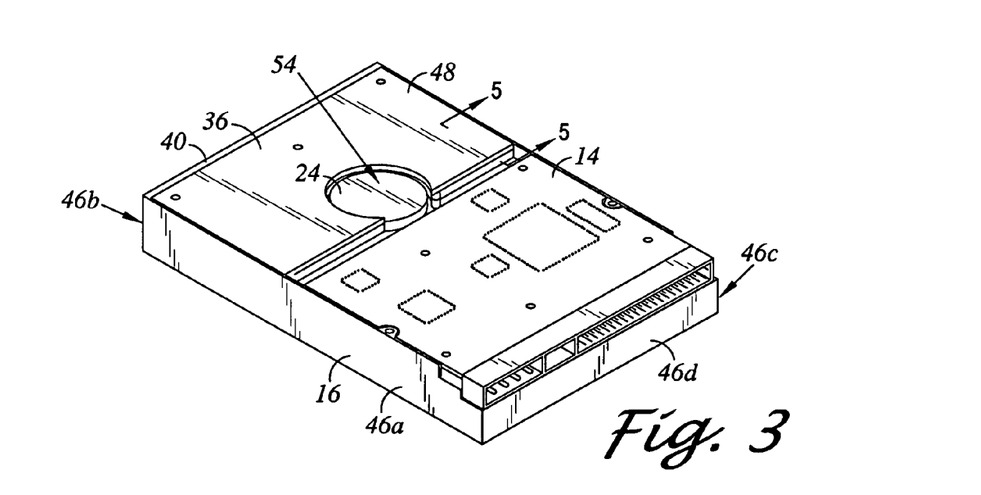
FIG. 3 is the disk drive base, the printed circuit board assembly and the weight plate of FIG. 2 as assembled.
Figure 4:
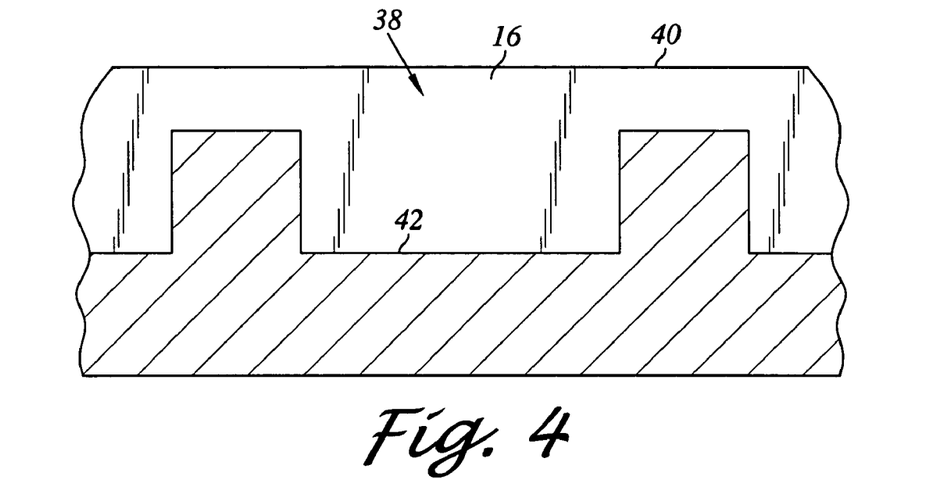
FIG. 4 is a cross sectional side view of the disk drive base as seen along axis 4-4 of FIG. 2.
Figure 5:
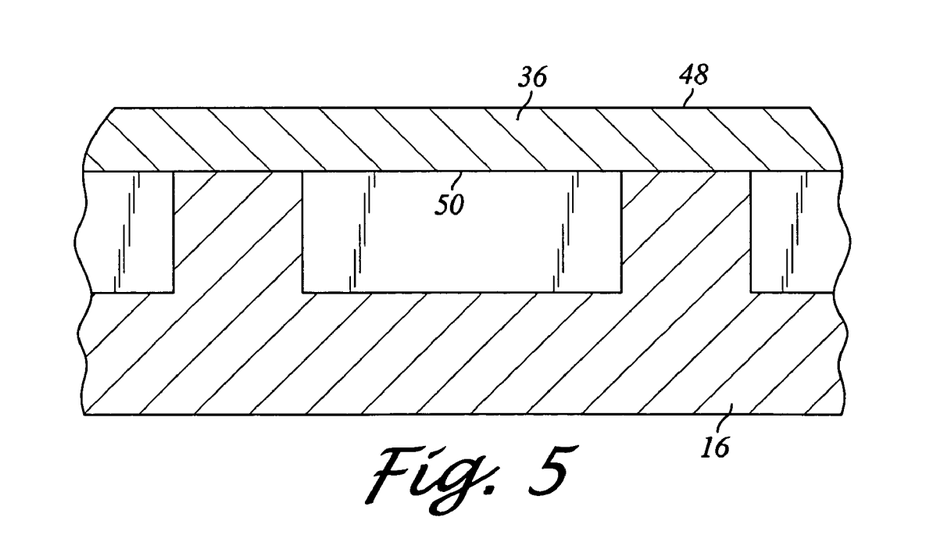
FIG. 5 is a cross sectional side view of the disk drive as seen along axis 5-5 of FIG. 3.
Figure 6:
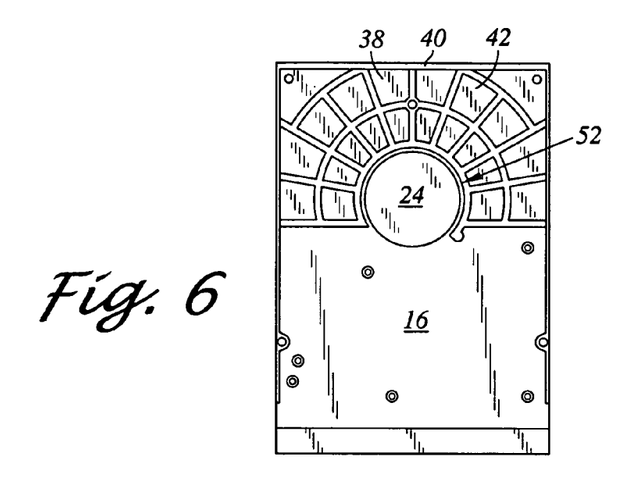
FIG. 6 is a bottom plan view of the disk drive base.

According to another aspect of the present invention, there is provided the disk drive 10. The disk drive 10 includes a disk drive base 16. Referring now to FIG. 2 there is depicted an enlarged perspective view of the disk drive base 16 of FIG. 1 after having been flipped as shown with the printed circuit board assembly 14 and a weight plate 36 exploded from the disk drive base 16. FIG. 3 depicts the disk drive base 16, the printed circuit board assembly 14 and the weight plate 36 of FIG. 2 as assembled. FIG. 4 depicts a cross sectional side view of the disk drive base 16 as seen along axis 4-4 of FIG. 2, and FIG. 5 depicts a cross sectional side view of the disk drive 10 as seen along axis 5-5 of FIG. 3. FIG. 6 depicts a bottom plan view of the disk drive base 16. The disk drive base 16 includes an exterior bottom side 38, a bottom peripheral edge 40 disposed about the exterior bottom side 38, and an exterior facing cavity 42 formed in the disk drive base 16 defined by the exterior bottom side 38. The disk drive 10 further includes the weight plate 36 attached to the disk drive base 16 within the exterior facing cavity 42. The weight plate includes an outer surface 48 and an opposing inner surface 50 (as respectively shown in the plan views of the weight plate 36 of FIGS. 7 and 8). The inner surface 50 is disposed towards the exterior bottom side 38. The outer surface 48 is substantially aligned with the bottom peripheral edge 40.

In further detail, the disk drive base 16 includes an exterior top side 44 opposite the exterior bottom side 38. In this regard, the exterior top side 44 is disposed facing the cover 18. The disk drive base 16 further includes a plurality of lateral sides 46a-d disposed lateral to the exterior bottom and top sides 38, 44. The bottom peripheral edge 40 is disposed adjacent the lateral sides 46a-d proximate the exterior bottom side 38.

As mentioned above the exterior facing cavity 42 is formed in the disk drive base 16 and is defined by the exterior bottom side 38. In the embodiment shown, the exterior facing cavity 42 extends about halfway across the exterior bottom side 38 on that portion of the exterior bottom side 38 adjacent the lateral side 46b. The printed circuit board assembly 14 is disposed adjacent the remaining portion of the exterior bottom side 38.

As mentioned above, the weight plate 36 is attached to the disk drive base 16 within the exterior facing cavity 42. In this regard, the weight plate 36 may be attached to the disk drive base 16 through the use of fasteners, such as screws 66 as shown in FIG. 1, and/or an adhesive for examples. It is contemplated that use of adhesives is particularly cost effective. While adhesives are generally disfavored in the context of disk drives, it is recognized that this application is external to the internal mechanisms of the disk drive 10 and therefore does not introduce contamination problems. Other methods of attachment may be chosen from those which are well known to one of ordinary skill in the art. As mentioned above, the weight plate 36 is attached to the disk drive base 16 within the exterior facing cavity 42 and substantially aligned with the bottom peripheral edge 40.

The bottom peripheral edge 40 may define a cavity cross sectional area aligned with the bottom peripheral edge 40. The weight plate 36 may extend substantially across an entirety of the cavity cross sectional area such as shown for example. As used herein the term substantially across refers to being at least ninety percent covered. Such coverage is contemplated to facilitate occupation of a substantial volume within the cavity 42 for modifying the overall mass of the disk drive 10 while maintaining the disk drive form factor.

Figure 7:
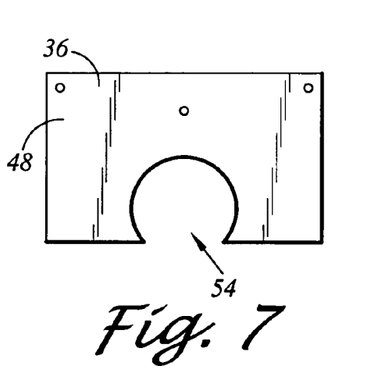
FIG. 7 is a plan view of an inner surface of the weight plate.
Figure 8:
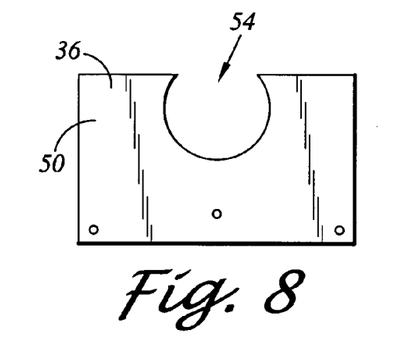
FIG. 8 is a plan view of an outer surface of the weight plate.

The exterior bottom side 38 may include a spindle motor portion 52. In this regard, the spindle motor 24 is disposed adjacent the spindle motor portion 52 through the disk drive base 16. The spindle motor portion 52 may further define the exterior facing cavity 42. The weight plate 36 may include a notched section 54 with the notched section 54 disposed adjacent to the spindle motor portion 52.

The present embodiment of the invention recognizes that the including of the weight plate 36 with the disk drive 10 modifies the vibration characteristics of the disk drive 10 as the weight plate 36 adds mass to the disk drive 10 without increasing the overall disk drive form factor. In this regard, an increased mass is contemplated to lower a magnitude of self-induced vibration because a greater mass results in a lower acceleration for a given force. In addition, an increased mass is contemplated to generally mitigate a magnitude of vibration due to externally applied forces in a disk drive operating environment. The weight plate 36 may be formed of various materials which may be chosen from those which are well known to one of ordinary skill in the art. For example, the weight plate 36 may be formed of a metal material, such as a steel material. This may be a relatively heavy and low cost material such as a cast steel material.

Figure 9:
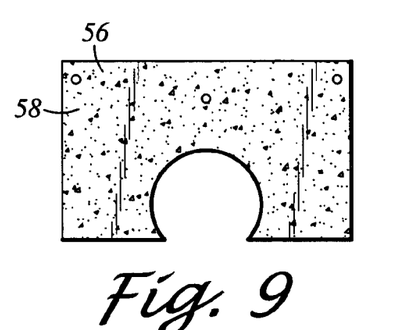
FIG. 9 is a plan view of an inner surface of a weight plate according to another embodiment.
Figure 10:
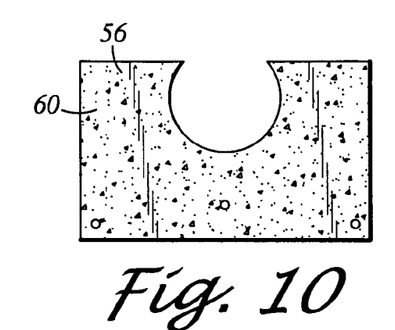
FIG. 10 is a plan view of an outer surface of the weight plate of FIG. 9.
Figure 11:
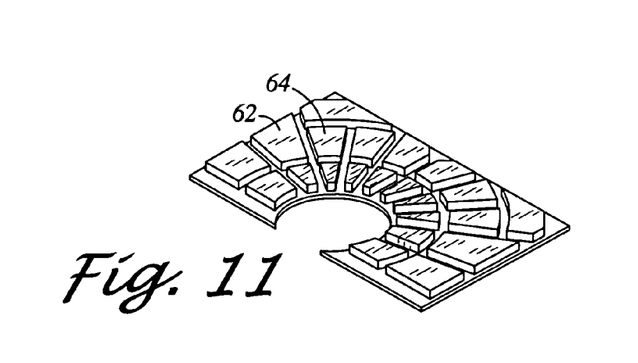
FIG. 11 is a perspective view of the weight plate according to another embodiment with a honeycomb contoured weight plate inner surface.

Referring now to FIGS. 9 and 10, there is depicted a weight plate 56 according to another embodiment. FIG. 9 is a plan view of an outer surface 58 of the weight plate 56. FIG. 10 is a plan view of an inner surface 60 of the weight plate 56. In this embodiment, it is contemplated that the weight plate 56 has a mass different than a mass of the weight plate 36. In this regard, the weight plate 56 may be formed of a material different than that of the weight plate 36, but nonetheless may be of the same dimensions.

The weight plates 36 and 56 are shown as being generally flat. In contrast, referring now to FIG. 11 there is depicted a weight plate 62 according to another embodiment. Depicted is a perspective view of an inner surface 64 of the weight plate 62. In this regard, the inner surface 64 is cooperatively formed with the exterior bottom side 38 of the disk drive base 16. The exterior bottom side 38 may include a structural honeycomb contour. As such the inner surface 64 is complementarily formed so as to interlock with the exterior bottom side 38. In this embodiment, it is contemplated that the weight plate 62 is formed of a same material as that of the weight plate 36. The weight plate 62, however, has a significantly greater mass than that of the weight plate 36 as its dimensions take advantage of the contour of the exterior bottom side 38. Further in this embodiment, the weight plate 62 is press-fit attached to the disk drive base 16. Adhesives and fasteners may additionally be used.

Referring now to FIG. 12 there is depicted another embodiment. FIG. 12 is a perspective view of a disk drive base 68 similar to that of the disk drive base 16. However, in this embodiment the disk drive base 68 includes a cavity 70 having an exterior bottom side 72 that is generally flat. The weight plate 36 or 56 may be efficiently attached to the disk drive base 68 at the exterior bottom side 72 through the use of an adhesive.

According to another aspect of the present invention, there is provided the disk drive 10. The disk drive 10 includes the disk drive base 16. The disk drive base 16 includes an exterior bottom side 38, the bottom peripheral edge 40 disposed about the exterior bottom side 38, and the exterior facing cavity 42 formed in the disk drive base 16 defined by the exterior bottom side 38. The disk drive 10 further includes the weight plate 36 attached to the disk drive base 16 within the exterior facing cavity 42. The cavity 42 defines a cavity cross sectional area aligned with the bottom peripheral edge 40, and the weight plate 36 extends substantially across an entirety of the cavity cross sectional area.

According to an aspect of the present invention, there is provided a method of fabricating disk drives. The method includes providing disk drives based upon a first disk drive configuration. The first disk drive configuration includes an operable disk drive, such as disk drive 10. As used herein, the term operable in the context of an operable disk drive refers to a disk drive that is capable of performing a data storage function. The disk drive 10 includes the disk drive base 16 with the exterior bottom side 38, and a first weight plate, such as weight plate 36, attached to the exterior bottom side 38 of the disk drive base 16. The method further includes providing disk drives based upon a second disk drive configuration. The second disk drive configuration includes the operable disk drive, such as disk drive 10, and a second weight plate, such as weight plate 56, attached to the exterior bottom side 38 of the disk drive base 16. The weight plate 56 has a mass different than a mass of the weight plate 36.

It is contemplated the first and second disk drive configurations have differing vibration characteristics as their respective masses are different. This enables a disk drive manufacturer to cost effectively provide disk drives based upon a common disk drive base while having the overall disk drive conform to differing vibration specifications through the use of the weight plates 36, 56. As such, the first and second disk drive configurations may have comparable data storage and retrieval performance while exhibiting substantially different vibration characteristics. Thus, the first and second disk drive configurations may be utilized for differing applications, such as for a personal computer and a set top audio visual application. The first disk drives may be provided to a first customer, and the second disk drives may be provided to a second customer. In another arrangement, the first disk drives and the second disk drives are provided to a same customer.

According to another aspect of the present invention, there is provided another method of fabricating disk drives. The method includes providing disk drives based upon a first disk drive configuration. The first disk drive configuration includes an operable disk drive, such as disk drive 10, including the disk drive base 16 with the exterior bottom side 38, and a weight plate, such as weight plate 36, attached to the exterior bottom side 38 of the disk drive base 16. The method further includes providing disk drives based upon a second disk drive configuration. The second disk drive configuration includes the operable disk drive, such as disk drive 10. The disk drive base 16 is exposed without any weight plate attached to the exterior bottom side 38. The first disk drives may be provided to a first customer, the second disk drives may be provided to a second customer. In another arrangement, the first disk drives and the second disk drives are provided to a same customer.

Referring now to FIG. 13 (PRIOR ART) is a exploded perspective view similar to that of FIG. 2, however, with a prior art disk drive 74 including an electromagnetic shield 76 attached to a disk drive base 80. The disk drive base 80 includes a bottom peripheral edge 82 that defines a disk drive form factor. The disk drive 80 further includes a cavity 84 formed in the disk drive base 80 adjacent the peripheral outer edge 82. For ease of discussion the prior art disk drive 74 includes the printed circuit board 14. FIG. 14 (PRIOR ART) is a cross sectional side view of the disk drive base 84 as seen along axis 14-14 of FIG. 13 as shown with the electromagnetic shield 76 disposed within the cavity 84. The electromagnetic shield 76 includes an outer surface 78. The electromagnetic shield 76 is utilized to shield electromagnetic waves associated with the disks stored within the disk drive 74. As such, the electromagnetic shield 76 is generally c-shaped following the contour of the disks within the disk drive 74. Various notches are disposed in the electromagnetic shield 76 to accommodate various fasteners. The electromagnetic shield 76 is a relatively thin piece of metal material. In this regard, the outer surface 78 is significantly below the peripheral outer edge 82 well within the disk drive form factor.

We claim:

1. A method of fabricating a disk drive comprising:

selecting a weight plate to modify the vibration characteristics of a disk drive, the weight plate including a substantially flat outer surface and an opposing inner surface having non-extending edges, the disk drive including a printed circuit board assembly (PCBA) and a base having an exterior bottom side, a bottom peripheral edge disposed about the exterior bottom side, and an exterior facing cavity formed in the disk drive base adjacent the bottom peripheral edge and defined by the exterior bottom side;

attaching the PCBA within a first portion of the exterior facing cavity of the base; and attaching the weight plate within a second portion of the exterior facing cavity of the base adjacent the PCBA such that the weight plate is located within the bottom peripheral edge and is substantially aligned with and substantially adjacent to the bottom peripheral edge, wherein the weight plate is selected based upon a mass of the weight plate in order to modify the vibration characteristics of the disk drive such that the disk drive is suitable for a pre-determined application.

2. The method of claim 1, wherein the pre-determined application includes at least one of a personal computer application and a set top box application.

3. The method of claim 1, wherein attaching the weight plate within the second portion of the exterior facing cavity of the base further comprises fastening the weight plate to the base with fasteners.

4. The method of claim 1, wherein attaching the weight plate within the second portion of the exterior facing cavity of the base further comprises utilizing adhesive to adhere the weight plate to the base.

5. The method of claim 1, wherein attaching the weight plate within the second portion of the exterior facing cavity of the base further comprises press-fitting the weight plate to the base.

6. The method of claim 1, further comprising forming an inner surface of the weight plate to cooperate with the surface of the exterior bottom side.

7. The method of claim 6, wherein the inner surface of the weight plate is formed to be substantially flat to cooperate with a substantially flat surface of the exterior bottom side.

8. The method of claim 6, wherein the inner surface of the weight plate is formed to include a honeycomb structure to cooperate with a honeycomb counter of the exterior bottom side.

9. The method of claim 1, further comprising forming the weight plate from a metal material.

10. The method of claim 1, further comprising forming the weight plate from a steel material.

11. A method of fabricating a disk drive comprising:

selecting a weight plate based upon a mass of the weight plate in order to modify the vibration characteristics of the disk drive such that the disk drive is suitable for a pre-determined application, the weight plate including a substantially flat outer surface and an opposing inner surface having non-extending edges, the disk drive including a printed circuit board assembly (PCBA) and a base having an exterior bottom side, a bottom peripheral edge disposed about the exterior bottom side, and an exterior facing cavity formed in the disk drive base adjacent the bottom peripheral edge and defined by the exterior bottom side;

attaching the PCBA within a first portion of the exterior facing cavity of the base; and attaching the weight plate within a second portion of the exterior facing cavity of the base adjacent the PCBA such that the weight plate is located within the bottom peripheral edge and is substantially aligned with and substantially adjacent to the bottom peripheral edge, the weight plate having an inner surface that is formed to cooperate with the surface of the exterior bottom side.

12. The method of claim 11, wherein the pre-determined application includes at least one of a personal computer application and a set top box application.

13. The method of claim 11, wherein attaching the weight plate within the second portion of the exterior facing cavity of the base further comprises fastening the weight plate to the base with fasteners.

14. The method of claim 11, wherein attaching the weight plate within the second portion of the exterior facing cavity of the base further comprises utilizing adhesive to adhere the weight plate to the base.

15. The method of claim 11, wherein attaching the weight plate within the second portion of the exterior facing cavity of the base further comprises press-fitting the weight plate to the base.

16. The method of claim 11, wherein the inner surface of the weight plate is formed to be substantially flat to cooperate with a substantially flat surface of the exterior bottom side.

17. The method of claim 11, wherein the inner surface of the weight plate is formed to include a honeycomb structure to cooperate with a honeycomb counter of the exterior bottom side.

18. The method of claim 11, further comprising forming the weight plate from a metal material.

19. The method of claim 11, further comprising forming the weight plate from a steel material.

\* \* \* \* \*